US008140503B2

(12) United States Patent
Ichino

(10) Patent No.: US 8,140,503 B2
(45) Date of Patent: Mar. 20, 2012

(54) INFORMATION PROCESSING APPARATUS HAVING PROCESS UNITS OPERABLE IN PARALLEL

(75) Inventor: Kiyohisa Ichino, Minato-ku (JP)

(73) Assignee: NEC Corporation, Tokyo (JP)

( * ) Notice: Subject to any disclaimer, the term of this patent is extended or adjusted under 35 U.S.C. 154(b) by 704 days.

(21) Appl. No.: 12/251,883

(22) Filed: Oct. 15, 2008

(65) Prior Publication Data

US 2009/0106187 A1   Apr. 23, 2009

(30) Foreign Application Priority Data

Oct. 18, 2007   (JP) .................................. 2007-271766

(51) Int. Cl.
*G06F 17/30* (2006.01)
(52) U.S. Cl. ........................................................ 707/705
(58) Field of Classification Search .................. 707/705, 707/764, 999.001
See application file for complete search history.

(56) References Cited

U.S. PATENT DOCUMENTS

| 6,170,051 | B1 * | 1/2001 | Dowling ........................ 712/225 |
| 6,658,655 | B1 * | 12/2003 | Hoogerbrugge et al. ..... 717/139 |
| 7,181,594 | B2 * | 2/2007 | Wilkinson et al. .............. 712/11 |
| 7,725,689 | B2 * | 5/2010 | Kissell ........................... 712/220 |
| 7,725,697 | B2 * | 5/2010 | Kissell ........................... 712/244 |
| 7,730,291 | B2 * | 6/2010 | Kissell ........................... 712/244 |
| 2003/0145173 | A1 * | 7/2003 | Wilkinson et al. ............. 711/140 |
| 2003/0191927 | A1 * | 10/2003 | Joy et al. ....................... 712/228 |
| 2007/0174597 | A1 * | 7/2007 | Joy et al. ....................... 712/228 |
| 2010/0201703 | A1 * | 8/2010 | Jiao ................................ 345/589 |

FOREIGN PATENT DOCUMENTS

| JP | 2000-076107 A | 3/2000 |
| JP | 2004-227569 A | 8/2004 |

* cited by examiner

*Primary Examiner* — Robert Timblin
(74) *Attorney, Agent, or Firm* — Sughrue Mion, PLLC

(57) ABSTRACT

An information processing apparatus according to an exemplary aspect of the invention includes a plurality of process units operable in parallel and a cache unit. The information processing apparatus executes a series of processes including access to a database through pipelining of the plurality of process units. The plurality of process units corresponds to a plurality of block process on a one-by-one basis. The series of processes are divided into the plurality of block processes such that reference of a content of data stored in the database by one of the plurality of process units is not followed by update of the data by any of others of the plurality of process units. Each of the plurality of process units executes one of the plurality of block processes at a predetermined timing. The plurality of block processes include a first block process including update of first data in the database. The plurality of process units includes a first process unit corresponding to the first block process. Updated contents of the first data are obtained in executions of the first block process by the first process unit. The cache unit is provided to be associated with the first process unit and holds the updated contents in a format by which an order of additions of the updated contents is recognizable.

9 Claims, 14 Drawing Sheets

Fig. 2 RELATED ART

| TIME | INPUTTED NAME CARD | PROCESSOR CORE 901-1 | PROCESSOR CORE 901-2 | PROCESSOR CORE 901-3 | TOTAL AMOUNT IN DATABASE |
|---|---|---|---|---|---|
| t1 | TANAKA | X←TOTAL AMOUNT (X=15) | | | 15 YEN |
| t2 | TANAKA | X←TOTAL AMOUNT (X=15) | X←X+1 (X=16) | | 15 YEN |
| t3 | TANAKA | X←TOTAL AMOUNT (X=15) | X←X+1 (X=16) | UPDATE OF TOTAL AMOUNT (X=16) | 15 YEN |
| t4 | | | X←X+1 (X=16) | UPDATE OF TOTAL AMOUNT (X=16) | 16 YEN |
| t5 | | | | UPDATE OF TOTAL AMOUNT (X=16) | 16 YEN |
| t6 | | | | | 16 YEN |

Fig. 3 RELATED ART

| TIME | INPUTTED NAME CARD | PROCESSOR CORE 901-1 | PROCESSOR CORE 901-2 | PROCESSOR CORE 901-3 | TOTAL AMOUNT IN DATABASE |
|---|---|---|---|---|---|
| t1 | TANAKA | X←TOTAL AMOUNT (X=15) | | | 15 YEN |
| t2 | TANAKA | (STALL) | X←X+1 (X=16) | | 15 YEN |
| t3 | TANAKA | (STALL) | (STALL) | X←TOTAL AMOUNT (X=16) | 15 YEN |
| t4 | | X←TOTAL AMOUNT (X=16) | (STALL) | (STALL) | 16 YEN |
| t5 | | (STALL) | X←X+1 (X=17) | (STALL) | 16 YEN |
| t6 | | (STALL) | (STALL) | UPDATE OF TOTAL AMOUNT (X=17) | 16 YEN |
| t7 | | X←TOTAL AMOUNT (X=17) | (STALL) | (STALL) | 17 YEN |
| t8 | | | X←X+1 (X=18) | (STALL) | 17 YEN |
| t9 | | | | UPDATE OF TOTAL AMOUNT (X=18) | 17 YEN |
| t10 | | | | | 18 YEN |

Fig. 9

|  | FIRST PROCESS UNIT | SECOND PROCESS UNIT | . . . | N-th PROCESS UNIT |
|---|---|---|---|---|
| COLUMN DATA 1 | Read/Write | Read/Only | . . . | Read/Only |
| COLUMN DATA 2 | — | Read/Write | . . . | Read/Only |
| : | : | : | . . . | Read/Only |
| COLUMN DATA N | — | — | . . . | Read/Write |

Fig. 14

| TIME | INPUTTED NAME CARD | PROCESSOR CORE 901-1 | PROCESSOR CORE 901-2 (SELECTION) | PROCESSOR CORE 901-2 | PROCESSOR CORE 901-2 (REGISTRATION) | PROCESSOR CORE 901-3 | TOTAL AMOUNT IN DATA BASE |
|---|---|---|---|---|---|---|---|
| t1 | TANAKA | X←TOTAL AMOUNT (X=15) | | | | | 15 YEN |
| t2 | TANAKA | X←TOTAL AMOUNT (X=15) | NO CORRESPONDING DATA | X←X+1 (X=16) | "TANAKA" X=16 | | 15 YEN |
| t3 | TANAKA | X←TOTAL AMOUNT (X=15) | X=16 | X←X+1 (X=17) | "TANAKA" X=17 | UPDATE OF TOTAL AMOUNT (X=16) | 15 YEN |
| t4 | | | X=17 | X←X+1 (X=18) | "TANAKA" X=18 | UPDATE OF TOTAL AMOUNT (X=17) | 16 YEN |
| t5 | | | | | | UPDATE OF TOTAL AMOUNT (X=18) | 17 YEN |
| t6 | | | | | | | 18 YEN |

INFORMATION PROCESSING APPARATUS HAVING PROCESS UNITS OPERABLE IN PARALLEL

INCORPORATION BY REFERENCE

This application is based upon and claims the benefit of priority from Japanese patent application No. 2007-271766, filed on Oct. 18, 2007, the disclosure of which is incorporated herein in its entirely by reference.

TECHNICAL FIELD

The present invention relates to an information processing apparatus, an information processing method, and a recording medium which records a computer-readable program, and more particularly, to an information processing apparatus, an information processing method, and a recording medium which records a computer-readable program for executing a series of processes including access to a database through pipelining of process units operable in parallel.

BACKGROUND ART

Over the last few decades, along with an advancement of technology for semiconductor, a clock frequency and performance of a microprocessor have been rapidly increased and improved, respectively. However, in recent years, miniaturization in semiconductor process has approached its limit, and an increase in clock frequency of the microprocessor has slowed down. In order to improve the performance of microprocessor under such circumstances, there is in the semiconductor industry a trend in which a plurality of processor cores (hereinafter referred to as cores) are provided to a microprocessor die instead of increasing the clock frequency. A multi-core CPU provided with two to four cores in a die has already been distributed for a personal computer for general use. Also, research and development of a processor provided with a few dozen or more cores are intensively conducted. The processor with a few dozen or more cores is referred to as a many-core processor, or simply as a many-core.

Also, a die provided with plurality of cores appeared for a specific purpose processor such as DSP (Digital Signal Processor), image processor, and network processor earlier than for a general purpose processor. A die will tend to be provided with more and more processors in the future, due to the above mentioned problems in the technology for semiconductor.

A transition from a single-core processor to a multi-core processor and further to a many-core processor brings a change to programming. It is widely recognized that programming suitable for parallel processing is required in order to bring out abilities of the multi-core processor or the many-core processor to the maximum extent.

As one of programming for accelerating a process by using a plurality of processor cores, a pipelining is generally known. The pipelining in the programming is essentially the same as a conveyer system with a belt conveyer in a factory. In the factory, a series of working processes are divided into a plurality of processes which can be executed independently, and workers (or processing machineries) are assigned to the processes respectively. The workers are arranged along the belt conveyer and each worker perform an assigned process to a working object. Since the plurality of workers perform independently and in parallel the plurality of processes of the series of processes, before a series of working processes for a working object finishes, a series of working processes for the next working object starts. Therefore, the performance in the whole factory is excellent in the above case compared to a case in which a worker performs the whole of series of working processes. In the pipelining in the programming, a plurality of processor cores linked together physically or logically corresponds to a plurality of workers and each of the processor is in charge of a part of a series of processes. The processor cores perform the assigned processes along a flow of data corresponding to a start instruction.

However, there are not a few applications unsuitable for the pipelining. In particular, in an application in which a transaction of database executed in the processing, when successive reference and update are performed for a specific region of the database, an exclusive control of access is required to maintain the database consistency. The exclusive control may cause a temporal stop of the pipeline (or a pipeline stall) and remarkable decrease the process performance.

In relation to a method for performing in parallel a series of processes including access to a database, Japanese Laid Open Patent Application (JP-P2004-227569A) discloses a method for managing correction of a persistent object in a multiuser environment.

Also, Japanese Laid Open Patent Application (JP-P2000-76107A) discloses a database management method. According to the method, time for reading data from a database and time for writing data in the database are reduced as much as possible and the latest write data can be read from the database.

The present inventor has recognized as follows.

A conventional pipelining cannot be easily applied to an application including access to a database. The reason why the pipelining cannot be easily applied to the application will be described by using a specific example. FIG. 1 shows a simple accounting apparatus 900 as an example. The accounting apparatus 900 performs accounting through pipelining of three processor cores 901-1 to 901-3.

A card (hereinafter referred to as a name card 910) on which a name of a person is shown is inputted to the accounting apparatus 900. The accounting apparatus 900 includes an accounting information database 902. The accounting information database 902 includes a plurality of records 920, and each of the records 920 includes two pieces of column data of a person's name 921 and a total amount 922. Every time receiving a name card 910, the accounting apparatus 900 adds 1 to a total amount 922 corresponding to the person's name indicated the name card 910.

The accounting apparatus 900 divides this operation into the following three steps S91 to S93 and executes them through pipelining.

Step S91: a record 920 having a person's name 921 corresponding to the inputted name card 910 is searched from the accounting information database 902 and a current total amount 922 in the searched record 920 is obtained. The obtained total amount 922 is assigned to X.

Step S92: 1 is added to X.

Step S93: the total amount 922 in the record 920 searched in Step S91 is updated with X.

In response to the input of the name card 910, the processor core 901-1 executes Step S91. The processor core 901-2 executes Step S92 upon receipt of the results obtained by the processor core 901-1. The processor core 901-3 executes Step S93 upon receipt of the results obtained by the processor core 901-2. That is, the accounting apparatus 900 processes in parallel three name cards 910 at maximum through pipelining.

However, there is a problem that accounting is not normally executed when the same name card 910 is successively inputted to the accounting apparatus 900. FIG. 2 is a time chart for illustrating the problem.

Referring to the time chart of FIG. 2, the accounting apparatus 900 successively receives three times a name card 910 indicating "TANAKA". A desired result is that the total amount 922 for "TANAKA" is increased by 3 in the accounting information database 902. However, in fact, the total amount 922 is only increased by 1.

The reason why the desired result cannot be obtained is that the isolation of the accounting information database 902 is not secured, and therefore the series of database transactions in the above-described Steps S91 to S93 is not serialized.

Meanwhile, when the accounting information database 902 is provided with a function for serializing the transactions, high process performance due to the pipelining is not obtained. For example, the accounting information database 902 is assumed to be a database provided with the function for serializing the transactions such as relational database. In this case, the record 920 corresponding to "TANAKA" is locked, and the exclusive control is carried out. The accounting apparatus 900 operates according to a time chart in FIG. 3, and the correct total amount 922 is obtained.

However, since a pipeline stall occurs due to the influence of the exclusive control, only one of three processor cores 901-1 to 901-3 can operate at a time. In other words, in spite of using the three processor cores, the process performance is almost same as that in a case of a single processor core.

As described above, in case of accelerating process by pipelining the series of processes including access to the database, a mechanism is required that can prevent occurrence of inconsistency in results even if the database transactions are executed in parallel. The mechanism is implemented by using the database provided with the function for serializing the transactions. However, the database provided with the function for serializing locks a part of regions of the database in executing the exclusive control, and therefore the pipeline stall may occur, resulting in a reduction in process performance.

It should be noted that the transaction management method disclosed in Japanese Laid Open Patent Application (JP-P2004-227569A) is one for a database in a multithreaded environment, but is not intended to solve a pipeline stall caused by a data hazard that is a problem in parallel programming based on the pipelining. Here, the data hazard means inconsistency in data content caused by inconsistency relevant to the order of reference and update of certain data in the database. Moreover, in the method disclosed in Japanese Laid Open Patent Application (JP-P2004-227569A), when a thread accesses certain data in the database, the other threads can not execute writing for the data. Accordingly, this method cannot solve the pipeline stall caused by the data hazard, and therefore an advantage of the multithread is insufficient.

An object of the database management method disclosed in Japanese Laid Open Patent Application (JP-P2000-76107A) is to reduce time for reading data and time for writing data for a database provided with a function for serializing transactions. However, a configuration is not indicated in which latest write data can be read from the database when transactions are executed in parallel through pipelining.

SUMMARY

An exemplary object of the invention is to provide an information processing apparatus, an information processing method, and a recording medium which records a computer-readable program which can ensure consistencies of a database and result and prevent a pipeline stall when a series of processes including access to the database are executed in parallel through pipelining.

An information processing apparatus according to an exemplary aspect of the invention includes a plurality of process units operable in parallel and a cache unit. The information processing apparatus executes a series of processes including access to a database through pipelining of the plurality of process units. The plurality of process units corresponds to a plurality of block process on a one-by-one basis. The series of processes are divided into the plurality of block processes such that reference of a content of data stored in the database by one of the plurality of process units is not followed by update of the data by any of others of the plurality of process units. Each of the plurality of process units executes one of the plurality of block processes at a predetermined timing. The plurality of block processes include a first block process including update of first data in the database. The plurality of process units includes a first process unit corresponding to the first block process. Updated contents of the first data are obtained in executions of the first block process by the first process unit. The cache unit is provided to be associated with the first process unit and holds the updated contents in a format by which an order of additions of the updated contents is recognizable.

An information processing method according to another exemplary aspect of the invention includes executing a series of processes including access to a database through pipelining of a plurality of process units. The plurality of process units correspond to a plurality of block process on a one-by-one basis. The series of processes are divided into the plurality of block processes such that reference of a content of data stored in the database by one of the plurality of process units is not followed by update of the data by any of others of the plurality of process units. The plurality of block processes include a first block process including update of first data in the database. The executing includes: holding updated contents of the first data obtained in executions of the block process in a format by which an order of additions of the updated contents is recognizable; and preferring a latest one of the updated contents to a content of the first data stored in the database in order to refer to the first data.

A recording medium according to another exemplary aspect of the invention, which records a computer-readable program that when executed causes a computer to perform an information processing method. The information processing method includes executing a series of processes including access to a database through pipelining of a plurality of process units. The plurality of process units correspond to a plurality of block process on a one-by-one basis. The series of processes are divided into the plurality of block processes such that reference of a content of data stored in the database by one of the plurality of process units is not followed by update of the data by any of others of the plurality of process units. The plurality of block processes include a first block process including update of first data in the database. The executing includes: holding updated contents of the first data obtained in executions of the block process in a format by which an order of additions of the updated contents is recognizable; and preferring a latest one of the updated contents to a content of the first data stored in the database in order to refer to the first data.

BRIEF DESCRIPTION OF THE DRAWINGS

The above and other objects, advantages and features of the present invention will be more apparent from the following description of certain exemplary embodiments taken in conjunction with the accompanying drawings, in which:

FIG. 2 shows an example of time chart of the information processing apparatus (accounting apparatus 900) shown in FIG. 1;

FIG. 3 shows another example of time chart of the information processing apparatus (accounting apparatus 900) shown in FIG. 1;

FIG. 9 is an explanatory diagram illustrating possible accesses by process units 2-1 to 2-N to column data 22-1 to 22-N;

FIG. 14 is a time chart for a case that the exemplary embodiment is applied to the information processing apparatus (accounting apparatus 900) shown in FIG. 1.

EXEMPLARY EMBODIMENTS

Hereinafter, an information processing apparatus, an information processing method and a recording medium which records a computer-readable program according to exemplary embodiments of the present invention will be described with reference to the attached drawings.

Figure 4:
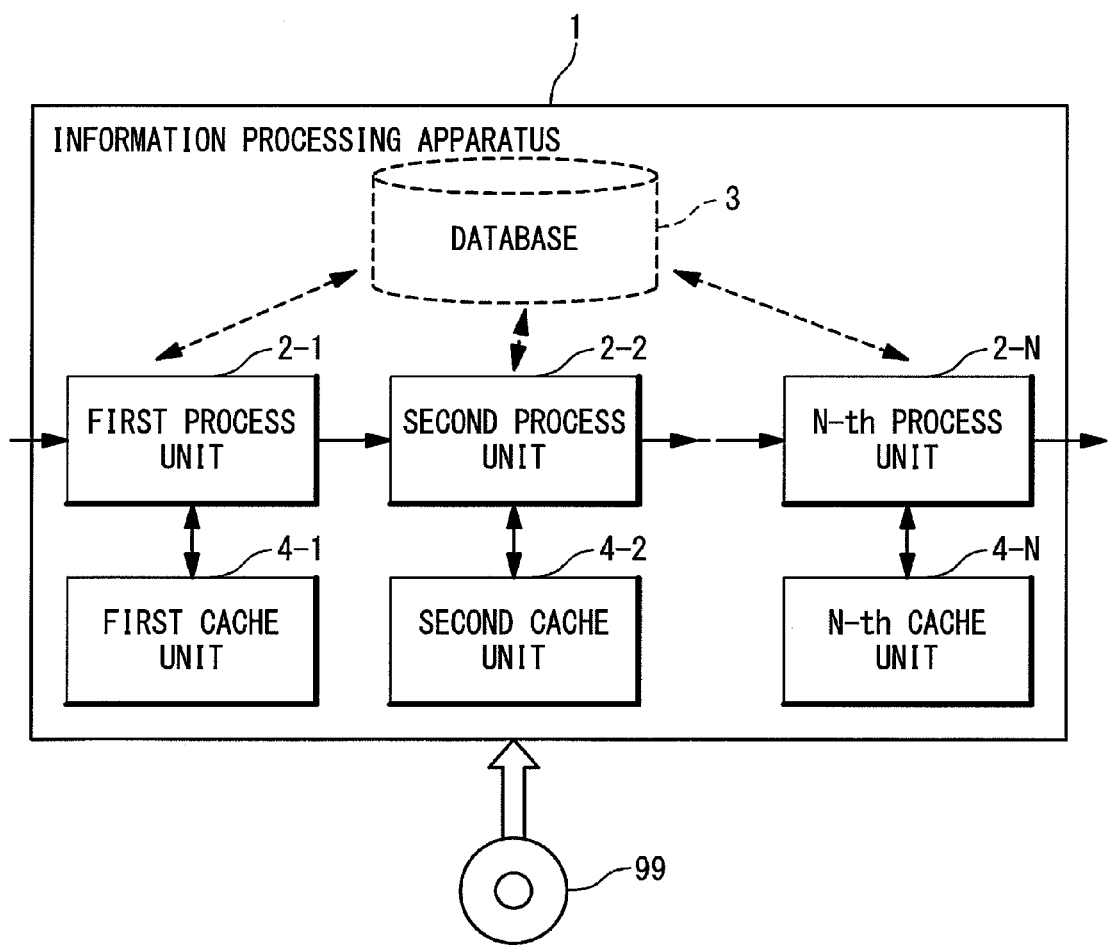
FIG. 4 is a block diagram illustrating a configuration of an information processing apparatus according to an exemplary embodiment of the present invention.

FIG. 4 is a block diagram illustrating a configuration of an information processing apparatus according to an exemplary embodiment of the present invention. As illustrated in FIG. 4, an information processing apparatus 1 according to the exemplary embodiment executes in parallel a series of processes including access to a database 3 through pipelining of a plurality of process units 2-1 to 2-N based on a computer-readable program recorded on a recording medium 99. The information processing apparatus 1 includes the plurality of process units 2-1 to 2-N and a plurality of cache units 4-1 to 4-N. The process units may be referred to as process executing units. Here, the database 3 is a storage system which can maintain data consistency when being accessed from a plurality of process units at a time. For example, the database 3 is a database system. The database 3 may be provided outside the information processing apparatus 1. In this case, the information processing apparatus 1 is accessibly connected with the database 3.

In the exemplary embodiment, the series of processes to be executed by the information processing apparatus 1 are divided into N steps in advance. Here, N is an integer equal to or more than 2. In each of N steps, a block process corresponding to the step is executed. The block process includes one or more processes. In the exemplary embodiment, the series of processes are divided such that after one of the process units refers to database (DB) data as data stored in the database 3, any of the others of the process units does not update the DB data. Here, the reference may be a reference for updating. The block processes are respectively assigned to the process units 2-1 to 2-N on a one-by-one basis in advance. For example, the block processes are assigned to the process units 2-1 to 2-N based on numbers identifying the process units 2 such that the first block process, the next block process and the last block process are respectively assigned to the process unit 2-1, the process unit 2-2 and the process unit 2-N.

The respective process units 2 (process units 2-1 to 2-N) are processing means operable in parallel. Each of the process units 2 executes the assigned block process at a predetermined timing. The timing may be a timing at which data is inputted to the process unit from external or a timing at which data is inputted to the process unit from another process unit corresponding to the previous stage in the pipeline.

The cache units 4 (cache units 4-1 to 4-n) are provided correspondingly to the process units 2-1 to 2-n, respectively. Each of the cache units 4 holds content of the DB data updated in the block process by the corresponding process unit 2 in a format by which the order of addition of the content is recognizable until at least the content is reflected in the database 3. Alternatively, a cache unit 4 is provided to each process unit 2 to which the block process including update of the DB data is assigned and no cache unit 4 is provided to the process unit 2 to which no block process including update of the DB data is assigned.

The cache unit 4 holds a predetermined number of contents of the DB data updated in the block process by the corresponding process unit in a format by which the order of additions of the contents is recognizable, together with information for identifying the DB data. For example, the cache unit 4 may hold the content of the DB data together with a key in a record including the DB data or an item name of the DB data. Alternatively, the cache unit 4 may hold the contents of the DB data updated in the block process executed for a number of times, which is determined based on the number (pipeline execution number) of the block processes which are executed for the DB data between the read from the database 3 and the write to the database 3 in the series of processes, in a format by which the order of executions is recognizable. For example, the cache unit 4 may hold as history information the contents of the DB data updated in the block process executed for N−1 times. Here, N is the number of the stages of the pipelining.

When each process unit 2 refers to the content of the DB data in the block process, the process unit prefers the content held by the corresponding cache unit 4 to that stored in the database. At this time, when the cache unit 4 holds a plurality of contents of the same DB data, the process unit 2 prefers the latest content to the other contents. This can prevent the data hazard as a problem in parallel programming based on the pipelining.

Figure 5:
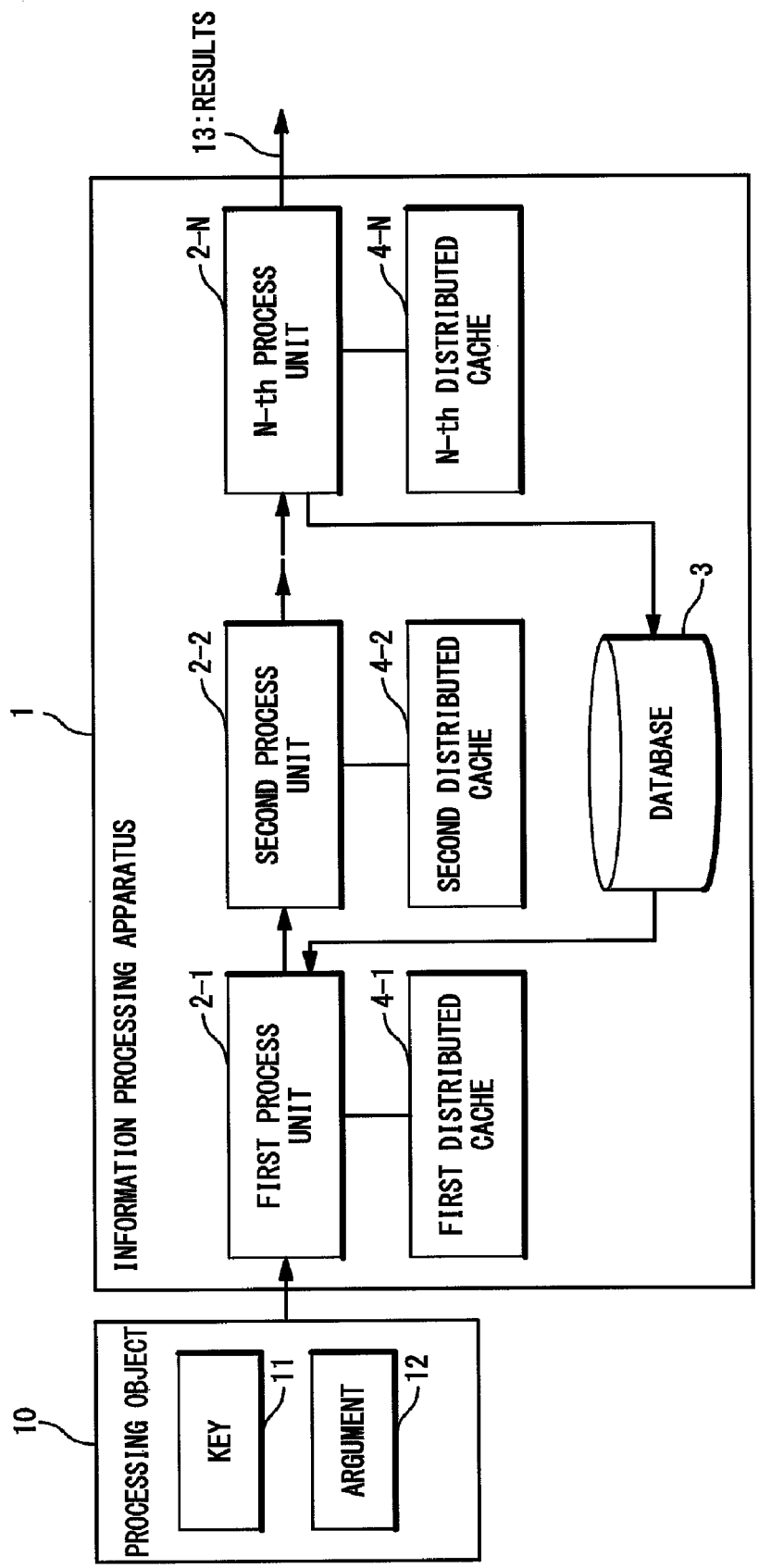
FIG. 5 is a block diagram illustrating a more specific configuration of the information processing apparatus according to the exemplary embodiment.

More specific descriptions will be given below. FIG. 5 is a block diagram illustrating a more specific configuration of the information processing apparatus according to the exemplary embodiment. The information processing apparatus 1 shown in FIG. 5 includes the plurality of process units 2-1 to 2-N and the plurality of distributed caches 4-1 to 4-N provided to the process units 2-1 to 2-N such that the distributed caches are respectively associated with the process units 2-1 to 2-N. The process units execute the divided processes of the series of processes including access to the database 3. The access is a read from the database 3 or a write in the database 3.

Each of the process units 2-1 to 2-N according to the exemplary embodiment is shown as processing means for causing a thread to operate. In general, a thread and a process are clearly distinguished; however, the thread according to the present exemplary embodiment is used as a generic name for a division unit of processes operable in parallel. Accordingly, the thread according to the exemplary embodiment means a thread in the strict meaning, a process and a task which are used to express a division unit of processes.

In the exemplary embodiment, the series of processes to be executed by the information processing apparatus 1 are divided into N steps in advance, and the N steps are respectively assigned to the process units 2-1 to 2-N on a one-by-one basis. For example, the divided steps are assigned to the process units 2-1 to 2-N based on numbers identifying the process units 2 such that the first step, the next step and the last step are respectively assigned to the process unit 2-1, the process unit 2-2 and the process unit 2-N.

Each of the process units 2 is embodied by, for example, a microprocessor core. One process unit may be embodied by one core, or two or more process units may be embodied by one core. In this case, for example, a program control is executed such that two or more threads operate on one core. Alternatively, all or part of the process units 2-1 to 2-N may be embodied as hardware circuits specialized in executing the assigned steps.

Each of the process units 2 (process units 2-1 to 2-N) executes the assigned step at a predetermined timing. Each of the distributed caches 4 (distributed caches 4-1 to 4-N) holds the content of DB data (data stored in the database 3) updated in the assigned step by the corresponding process unit 2, in a format by which the order of the execution is recognizable. In the exemplary embodiment, each of the distributed caches 4 holds the contents of the DB data updated in a predetermined number (e.g., N−1) of executions of the steps by the corresponding process unit, in a format by which the order of the executions is recognizable. The distributed caches 4-1 to 4-N are storage means corresponding to the cache units 4-1 to 4-N in FIG. 4.

Figure 6:
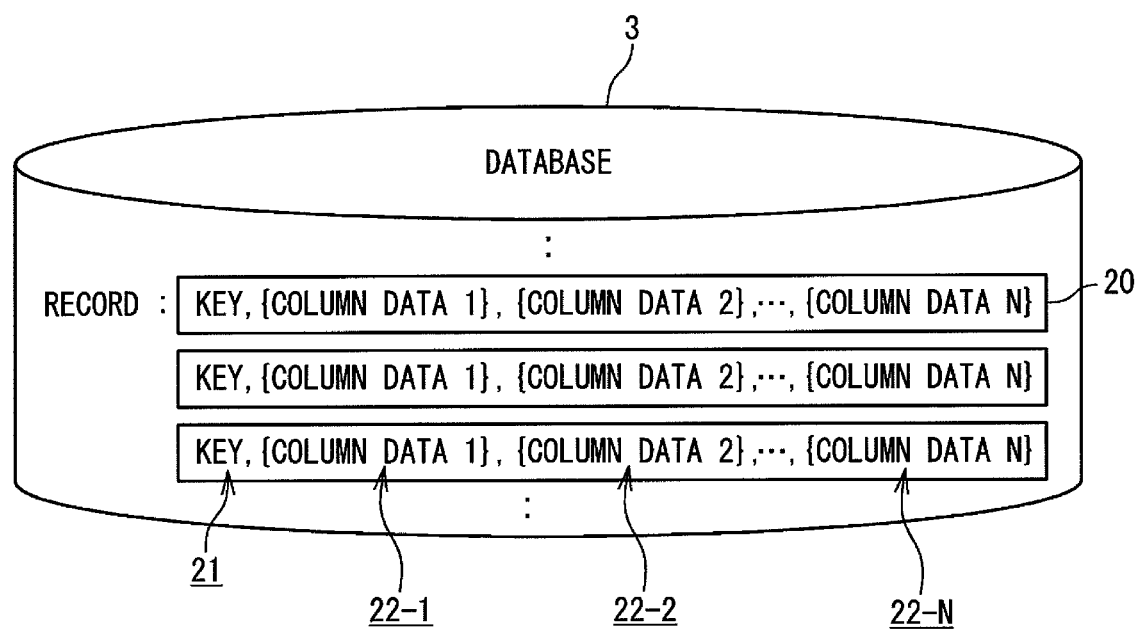
FIG. 6 shows information stored in a database 3.

The series of processes executed by the information processing apparatus 1 includes access to the database 3. FIG. 6 shows information stored in the database 3. As shown in FIG. 6, the database 3 according to the present exemplary embodiment stores one or more records 20. Each of the records 20 includes a key 21 for uniquely identifying the record 20 and column data 22-1 to 22-N. The respective column data 22 (column data 22-1 to 22-N) correspond to the process units 2 on a one-to-one basis. It should be noted that "column data" denote conceptually N bundles of data into which a data group stored as a record is divided based on the number of the process units each with a power to update the corresponding bundle. Therefore, "column data" do not necessarily denote the presence of N data items. Accordingly, there is no limitation to an information amount of one piece of column data. For example, column data 22-X may be a data set relevant to a plurality of data items, such as {Name a, Address b, Phone number c}. Here, X is an integer which is equal to or more than 1 and is equal to and less than N. Alternatively, column data 22-X may be a data set relevant to no data item. In this case, the information amount of the column data 22-X is zero. When an information amount of column data is zero, the process unit corresponding to the column data does not execute update for any DB data. The column data may include data only included in a specific record, such as a total value.

In response to the input of information indicating a processing object 10, the information processing apparatus 1 executes the series of processes for the processing object 10 and outputs results 13. When processing the processing object 10, the information processing apparatus 1 accesses one specific record 20 in the database 3. The record 20 to be accessed is determined by a key 11 included in the information indicating the processing object 10. Specifically, the record 20 having the key 21 corresponding to the key 11 is accessed. The processes to be executed for the processing object 10 are determined by instruction content indicated by an argument 12. When only fixed processes are executed for the processing object 10, the argument 12 can be omitted.

The information processing apparatus 1 executes the series of processes by referring to and updating the column data 22-1 to 22-N in the record 20 specified by the key 11 included in the information indicating the processing object 10, through executions of the block processes by the process units 2-1 to 2-N.

In the information processing apparatus 1, the process units 2-1 to 2-N operate in parallel based on the pipelining. If all of the process units 2-1 to 2-N were able to freely access the database 3, a load on the database 3 would be high and the performance would be low. In such a case, a mechanism for coping with simultaneous accesses should be introduced, resulting in higher complexity of the system. To avoid such problems, the number of process units 2 executing process (reading process) of referring to the content of the DB data in the database 3 is limited to a small number (is equal to or less than a predetermined number) and the number of process units 2 executing process (writing process) of updating the content of the DB data in the database 3 is limited to a small number (is equal to or less than a predetermined number). Preferably, the content of the DB data is read from the database 3 only in the block process executed at first and written to the database 3 only in the block process executed at last. That is, the process unit 2-1 reads at a time the contents of the DB data (i.e., column data 22-1 to 22-N) which are used by the subsequent process units, the contents are sequentially delivered to the process units 2-2 to 2-N in synchronization with the operation of the pipelining, and the process unit 2-N finally reflect the delivered contents in the database 3.

Figure 7:
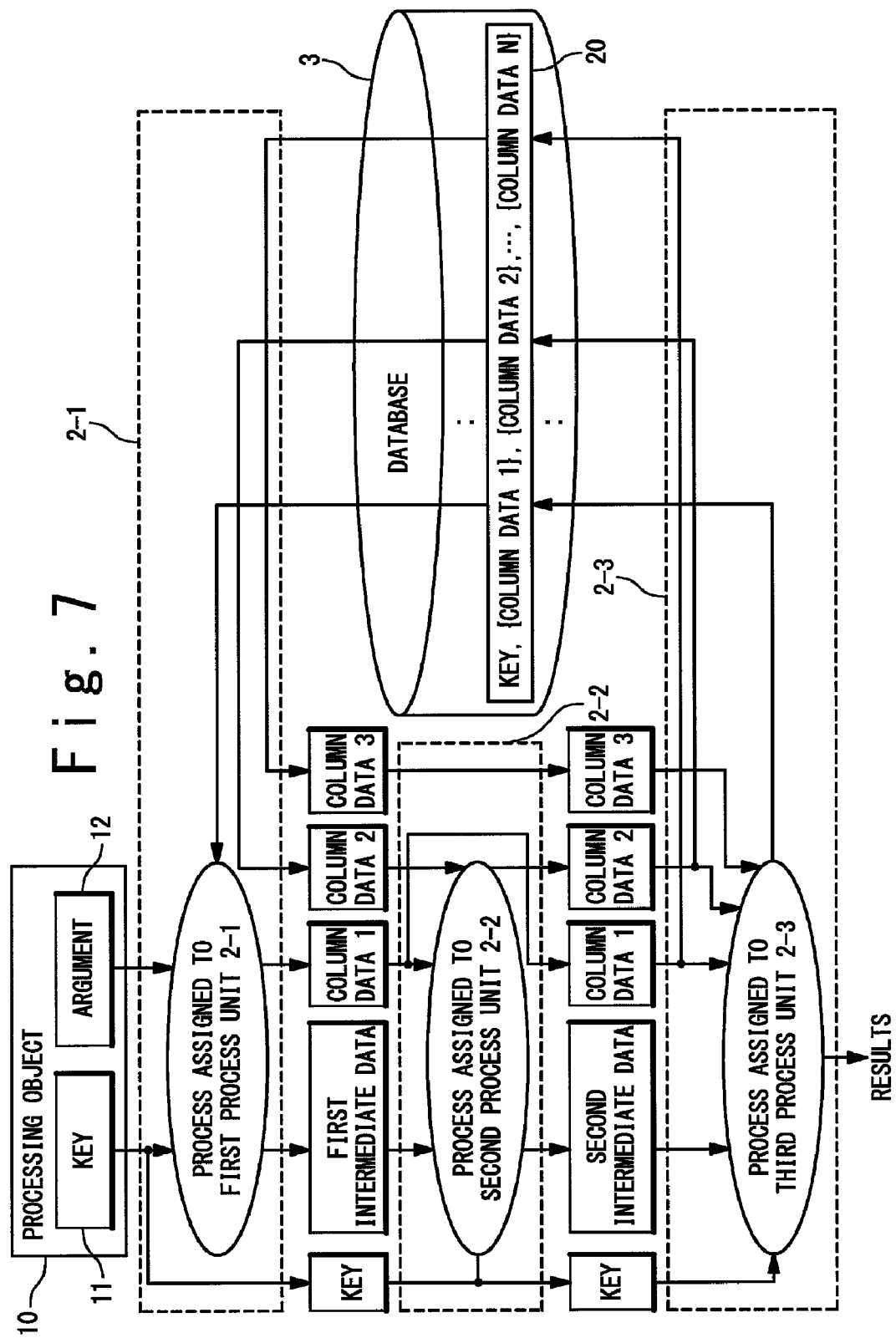
FIG. 7 is an explanatory diagram illustrating an example of a data flow in the information processing apparatus 1.

FIG. 7 is an explanatory diagram illustrating an example of data flow in the information processing apparatus 1. In the example illustrated in FIG. 7, the series of processes are divided into three block processes and the three block processes correspond to the process units 2-1 to 2-3 on a one-on-one basis. That is, the number N of threads operated in parallel is three. As described above, only the first process unit 2-1 obtains contents (column data 22-1 to 22-3 in this example) of the record 20 from the database 3. Also, only the third (last) process unit 2-3 updates the contents of the record 20 in the database.

The first process unit 2-1, by executing the assigned step, obtains the contents of the record 20 for the processing object from the database 3, executes predetermined processes including update of the content of the column data 2-1 as needed, and delivers the processed contents of the column data 22-1 to 22-3 to the next process unit (process unit 2-2) after the completion of the processes. The second process unit 2-2, by executing the assigned step, takes over the column data 22-1 to 22-3 from the preceding process unit (process unit 2-1), executes predetermined processes including update of the content of the column data 2-2 as needed, and delivers the processed contents of the column data 22-1 to 22-3 to the next process unit (process unit 2-3) after the completion of the processes. The last process unit 2-3, by executing the assigned step, takes over the column data 22-1 to 22-3 from the previous process unit (process unit 2-2), executes predetermined processes including update of the content of the column data 22-3 as needed, updates the content of the record 20 for the processing object 20 in the database 3, and outputs the results 13.

In general, a process is not often completed within a thread. For this reason, results of processes partly completed by the process unit 2-X (X is an integer equal to or more than 1 and equal to or less than N) are required to be taken over by the next process unit 2-(X+1). When there is data necessary to be taken over between threads in addition to the DB data (column data 22-1 to 22-N), the data may be taken over as intermediate data as shown in FIG. 7. Also, the information (key 11 and argument 12) indicating the processing object 10 may be taken over.

In the example shown in FIG. 7, each of the distributed caches 4-1 to 4-3 stores the content of the column data updated by the corresponding one of the process units 2 (the process units 2-1 to 2-3). The column data other than the column data to be updated by certain process unit is not required to be held by the distributed cache corresponding to the process unit. Specifically, the process unit 2-2 (2-3) may refer to the column data 22-1 (22-1 or 22-2) other than the column data 22-2 (22-3) to be updated by the process unit 2-2 (2-3). Since the column data 22-1 (22-1 or 22-2) is delivered to the process unit 2-2 (2-3) after the content of the column data 22-1 (22-1 or 22-2) is appropriately rewritten by the previous process unit 2-1 (2-1 or 2-2), the column data 22-1 (22-1 or 22-2) is not required to be held by the distributed cache 4-2 (4-3) corresponding to the process unit 2-2 (2-3).

Next, a restriction on the accesses from the process units 2-1 to 2-N to the column data 22-1 to 22-N and necessity of the distributed caches will be described.

It can be said that there is a dependence relationship among a plurality of processing objects 10 having the same key 11 because a processing result is affected by the preceding processing result. When processes are simply executed in parallel for the processing objects 10 having the same key 11, the process for one of the processing objects 10 inputted at the late timing stops for the duration from the reference to the database 3 (the column data 22-1 to 22-N specified by the key 11 in this example) for the processing object 10 until the completion of the process for another of the processing objects 10 inputted at the early timing. This is a pipeline stall caused by the same mechanism which causes a Read-After-Write data hazard in pipelining in microprocessor and the pipeline stall reduces the performance as a result.

Therefore, in order to prevent the pipeline stall caused by the data hazard which means an inconsistency in data content caused by the inconsistency in the order of reference and update for the data in the database, the distributed caches for holding the column data contents updated by the process units 2-1 to 2-N are respectively provided for the process units 2-1 to 2-N, and restrictions are imposed on the accesses from the process units 2-1 to 2-n to the column data.

Figure 8:
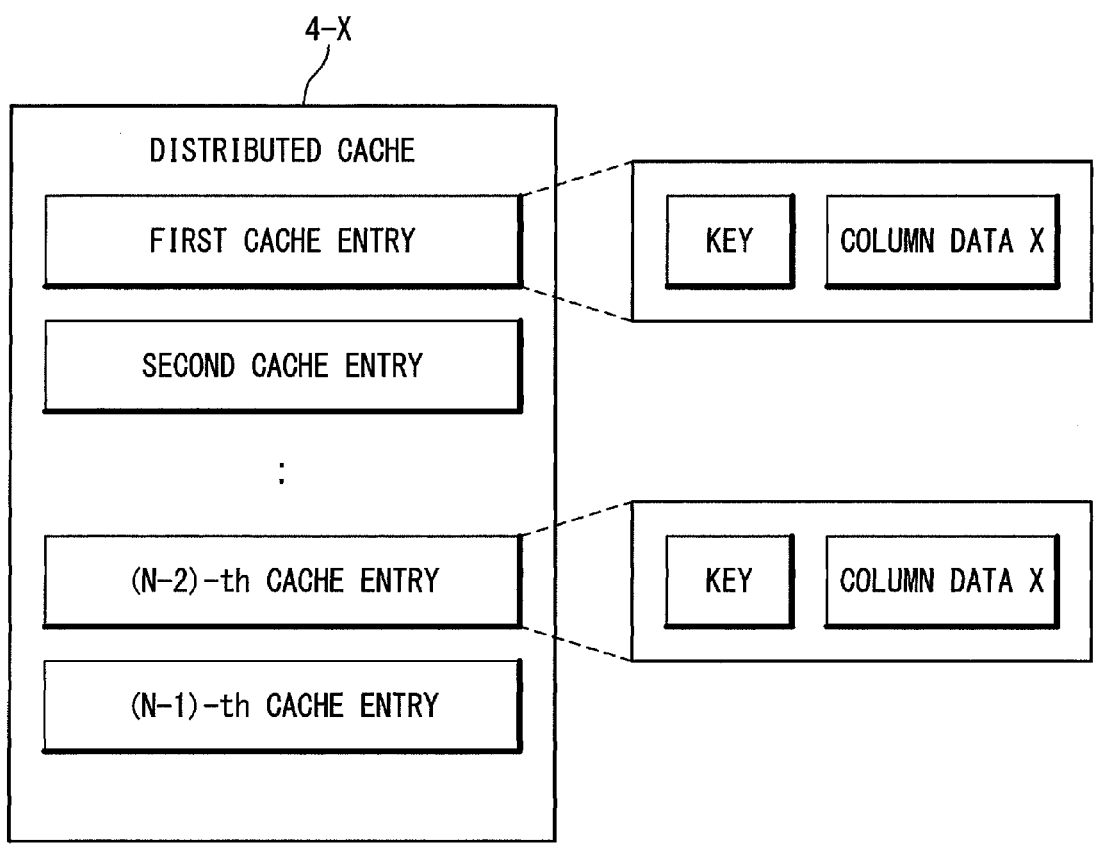
FIG. 8 is an explanatory diagram illustrating an example of configuration of information in a distributed cache 4-X.

FIG. 8 is an explanatory diagram illustrating an example of configuration of information in a distributed cache 4-X as one of the distributed caches 4-1 to 4-N. The distributed cache 4-X may be embodied as a FIFO (First-In First-Out) queue which is accessed from only the X-th process unit 2-X and registers N−1 cache entries therein. Here, when the first process unit 2-1 reads the record 20 from the database 3 and the N-th process unit 2-N reflects that record in the database 3, the number N−1 means a number of pipeline executions executed in the duration from the update of the content of the record 20 until the delivery of that record as the content stored in the database 3 to the corresponding process unit 2. Each of the entries includes the content of column data 22-X updated in the block process by the corresponding process unit 2-X and information (e.g. key 21) for identifying the column data 22-X. The information for identifying the column data 22-X may be information for identifying the record 20 as a processing object, which includes the column data 22-X, since data item of the column data 22-X updated by the process unit 2-X is fixedly assigned. The same explanation is can be applied to the other distributed caches 4.

FIG. 9 is an explanatory diagram illustrating possible accesses by the process units 2-1 to 2-N to the column data 22-1 to 22-N. In the present exemplary embodiment, the series of processes are divided in consideration of a processing order for each of the process units and a division unit such that after one of the process units refers to the data stored in the database 3, any of the others of the process units does not update the content of the data. It should be noted that the above reference includes a reference for updating. Accordingly, for each of data items of the database, a process unit having a power to update is assigned in advance, and access restrictions are imposed that the process unit 2-X (X is an integer equal to or more than 1 and equal to or less than N) can execute an update only for the column data as a bundle of data relevant to the data item assigned to the process unit 2-X and can execute a reference only for the column data 22-1 to 22-(X−1) as bundles of data relevant to the data items assigned to the process unit 2-X and the process units 2-1 to 2-(X−1). The process units 2-1 to 2-(X−1) corresponding to the previous stages in the pipelining, which precede the stage to which the process unit 2-X corresponds.

As described, by providing the distributed caches for holding the updated values obtained in the block processes by the process units 2-1 to 2-N and by imposing the access restriction, the data hazard can be prevented without locking transactions of the database. This is because even in the case that a series of processes is started for the next processing object before the writing in the database for the previous processing object, the process unit can obtain the processing results so far by referring to the content held in the corresponding cache and to the contents delivered from the processing units corresponding to the previous stages in the pipelining.

Next, operations according to the exemplary embodiment will be described referring to flowcharts shown in FIGS. 10 to 13. An operation of the information processing apparatus 1 according to the exemplary embodiment shown in FIG. 5 is described by describing an operation of the first process unit 2-1, an operation of the process unit 2-Y as one of the second to (N−1)-th process units and an operation of the process unit 2-N. The integer Y is equal to or more than 2 and less than N.

Figure 10:
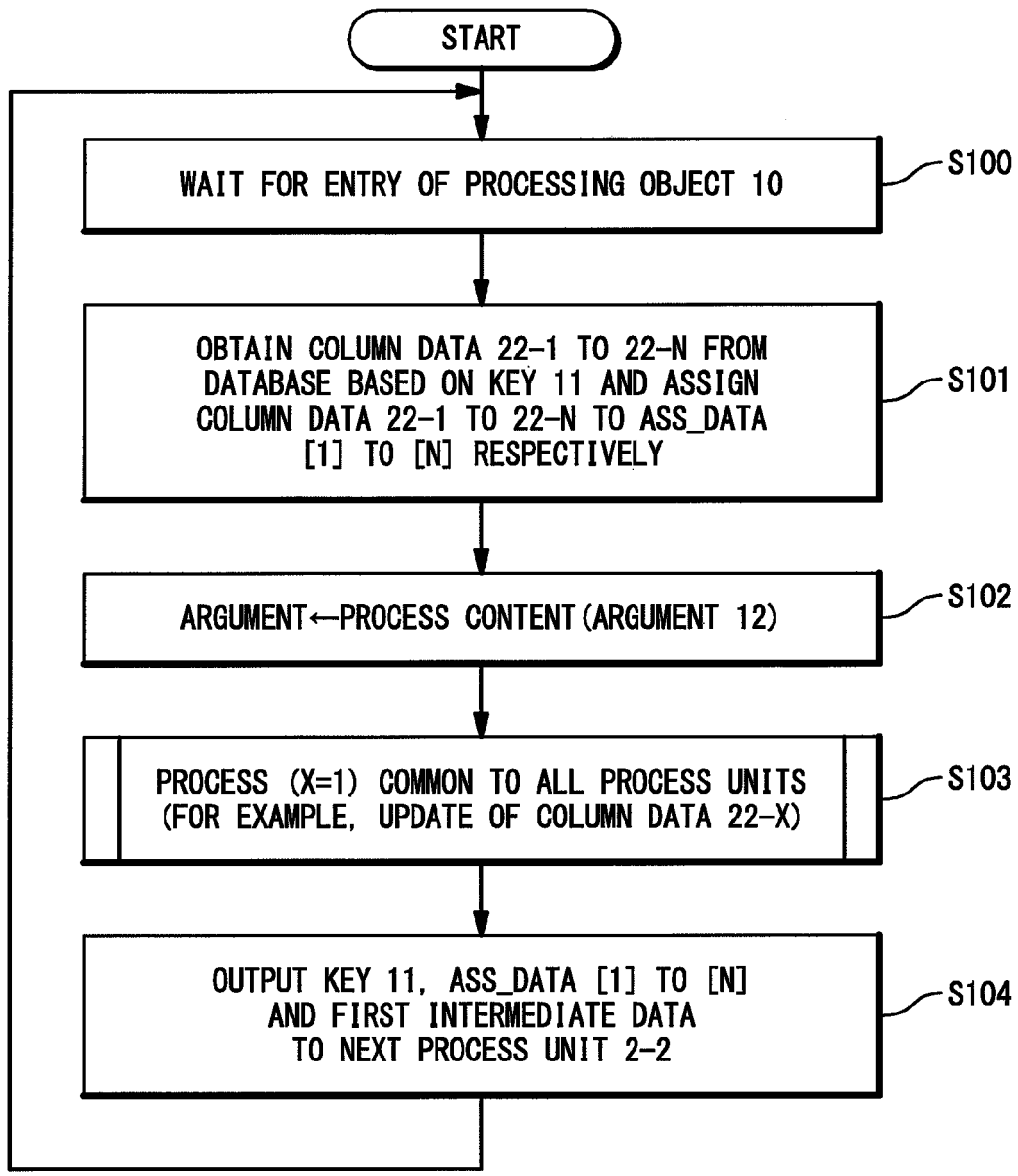
FIG. 10 is a flowchart illustrating an example of an operation of the first process unit 2-1.

First, the operation of the first process unit 2-1 is described referring to FIG. 10. FIG. 10 is the flowchart illustrating an example of the operation of the process unit 2-1 according to the exemplary embodiment. As illustrated in FIG. 10, the process unit 2-1 of the first processing order waits until the processing object 10 is inputted to the information processing apparatus 1, and upon input of the processing object 10, proceeds to the next Step S101 (Step S100).

In Step S101, the process unit 2-1 searches the database 3 to specify the record 20 corresponding to the key 11 included in the information indicating the processing object 10, and obtains the column data 22-1 to 22-N from that record 20. Also, the process unit 2-1 assigns the obtained column data 22-1 to 22-N to ASS_DATA [1] to ASS_DATA [N] as variables for holding the contents of the column data 22-1 to 22-N in the series of processes for the processing object 10 of this time.

The process unit 2-1 assigns an alias ARGUMENT to the argument 12 included in the information indicating the processing object 10, and then proceeds to Step S103 (Step S102). The ARGUMENT is used as a variable for storing instruction content.

Figure 11:
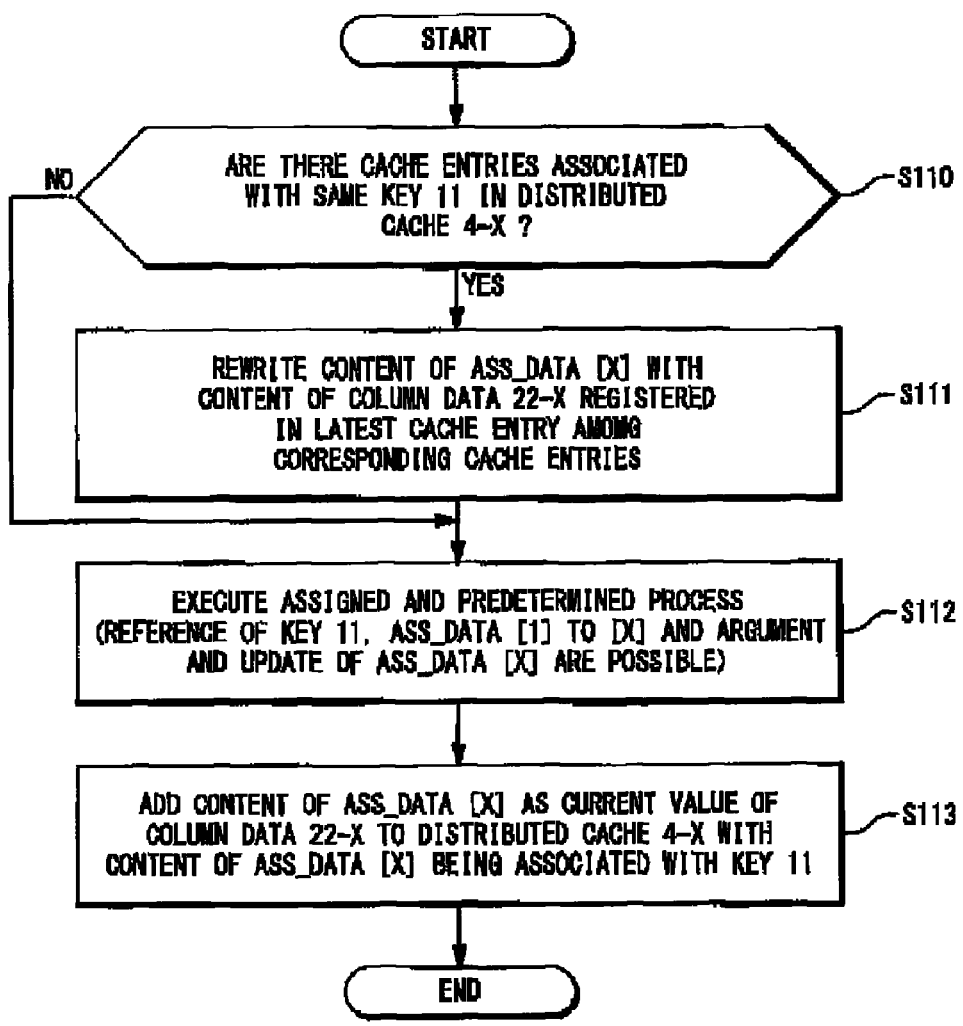
FIG. 11 illustrates an example of process flow of operation common to all the process units 2-1 to 2-N.

Subsequently, the process unit 2-1 executes a processing operation common to all of the process units (Step S103). FIG. 11 illustrates an example of process flow of the operation common to all of the process units 2. The processing operation invoked from the first process unit 2-1 will be described as an example. Accordingly, X=1 in FIG. 11. In this example, the distributed caches are assigned to all of the process units, respectively. No distributed cache may be assigned to the process unit to which the block process including no update of the DB data. In this case, the process (Step S103) is implemented as a process common to the process units to which the block processes including update of the DB data. The process units to which the block processes including no update of the DB data are only required to execute Step S112 in FIG. 11.

As the operation common to all of the process units 2-1 to 2-N, the process unit 2-X searches the distributed cache 4-X associated with the process unit 2-X to judge whether or not the content of the column data 22-X same as the column data 22-X in the series of processes for the processing object 10 of this time is registered in the distributed cache 4-X (Step S110). For example, the process unit 2-X judges whether or not a cache entry having the key 21 same as the key 11 included in the information indicating the processing object 10 exists in the distributed cache 4-X. If such cache entry exists (Yes in Step S110), the flow proceeds to Step S111.

In Step S111, the process unit 2-X rewrites the content of ASS_DATA [X] with the content of the corresponding column data 22-X searched in the distributed cache 4-X. Accordingly, even if past update results has not been reflected in the database 3 for the column data 22-X relevant to the processing object 10 of this time (or even if the past update results is reflected after the completion of the reading process), the past process results can be reflected and the series of processes of this time can be executed. When there exist a plurality of corresponding column data 22-X in the distributed cache 4-X, the content of the latest column data 22-X (or the column data 22-X registered as the cache entry which is added most recently among the cache entries having the same key 21 as the key 11) is preferentially used for the rewrite. As described above, since the distributed cache 4-X is embodied by the FIFO queue, the distributed cache 4-X can hold cache entries in the format by which the order of additions of the cache entries. Therefore, the latest column data 22-X can easily be specified among the corresponding column data 22-X.

On the other hand, when there is no corresponding cache entry (No in Step S110), it is judged that ASS_DATA [X] holds the content of the column data 22-X relevant to the processing object of this time, which is read from the database 3 after the reflection of the past process results, and then the flow directly proceeds to Step S112.

After the completion of the process for reflecting the past process results in ASS_DATA [X], a predetermined process assigned to the process unit 2-X is executed in Step S112. For example, the key 11 or ARGUMENT is referred to, or intermediate data 40-X is generated. The intermediate data 40-X is, for example, an internal event instruction converted from the argument 12 or a result obtained by applying a predetermined operation to the argument 12. Alternatively, ASS_DATA [1] to ASS_DATA [X] out of ASS_DATA [1] to ASS_DATA [N] are referred to, or ASS_DATA [X] is updated. It should be noted that the corresponding process unit can refer to ASS_DATA [1] to ASS_DATA [X−1] since the past process results for ASS_DATA [1] to ASS_DATA [X−1] are delivered to the corresponding process unit after the past process results are reflected by the preceding process units. When X=1, the process unit 2-1 can refer to and update only the column data 22-1 corresponding to the process unit 2-1, i.e., the content of ASS_DATA [1].

After the completion of the predetermined process assigned to the process unit 2-X in Step S112, the process unit 2-X causes the distributed cache 4-X to store the content of the column data 22-X updated in the predetermined process, i.e., the content of ASS_DATA [X], together with the key 11 for identifying the column data 22-X (Step S113). This is a process for enabling the use of the content of the column data 22-X updated in the series of processes of this time when another series of processing for the same processing object 10 as that in the series of processes of this time starts before the reflection in the database 3 of the content of the column data 22-X updated in the series of processes of this time. When the storage capacity of the distributed cache 4-X is exceeded as a result of adding a cache entry relevant to the update of this time to the distributed cache 4-X, the oldest cache entry is pushed out and deleted.

Then, the operation common to all of the process units 2-1 to 2-N ends, and the process unit 2-1 returns to the original operation.

The processes in Steps S110, S111 and S113 may be executed as independent steps in Step 112. For example, each of the process units 2 includes a selection unit (not shown) in common. The selection unit corresponding to the process unit 2-X executes a selection process by providing a function which is used by the process unit 2-X to refer to ASS_DATA [1] to ASS_DATA [N] in the block process. In the function, the latest content held in the distributed cache 4-X is preferentially selected as the object of reference. For example, each of the process units 2 includes a registration unit (not shown) in common. The registration unit corresponding to the process unit 2-X execute a registration process by providing a function which is used by the process unit 2-X to update ASS_DATA [1] to ASS_DATA [N] in the block process. In the function, ASS_DATA [X] is updated and the updated content is added to the distributed cache 4-X.

After the operation (Steps S110 to S113 in FIG. 11) common to all of the process units 2-1 to 2-N has been completed, the process unit 2-1 outputs the key 11, ASS_DATA [1] to ASS_DATA [N], and first intermediate data to the second process unit 2-2 (Step S104). Then, the process by the process unit 2-1 to one of the processing objects 10 is completed. The process unit 2-1 returns to Step S100, and waits for the next timing to start the block process.

Figure 1:
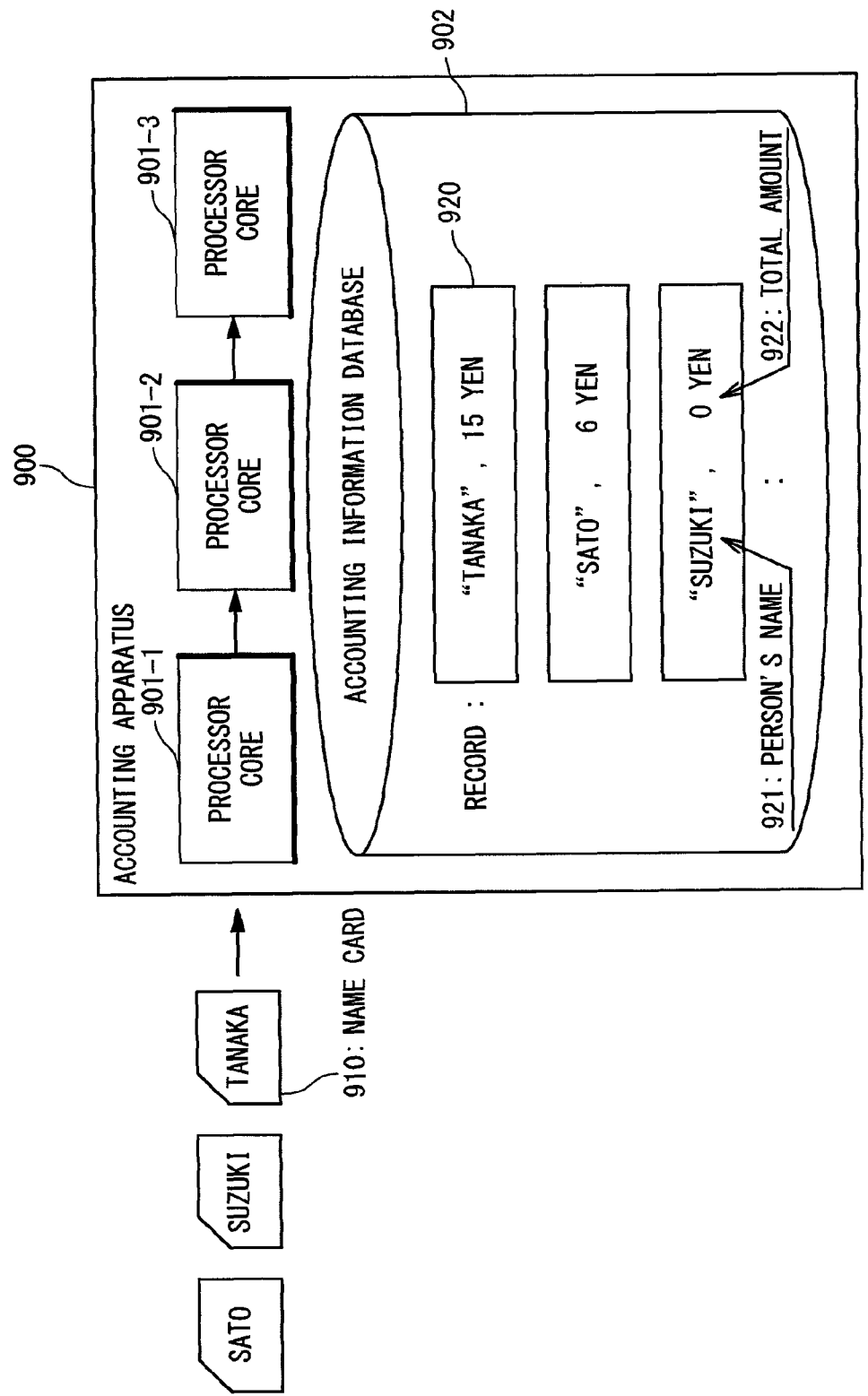
FIG. 1 is an explanatory diagram illustrating an example in which a pipelining is applied to an information processing apparatus executing a series of processes including access to a database.

For example, when the exemplary embodiment is applied to the accounting apparatus 900 illustrated in FIG. 1, the processor core 901-1 corresponding to the process unit 2-1 operates according to the flowchart illustrated in FIG. 10. In the example of the accounting apparatus 900 shown in FIG. 1, the processor core 901-2 has a power to update the total amount 922 as DB data. Accordingly, the total amount 922 corresponds to the column data 22-2. There is no DB data corresponding to the column data 22-1 or 22-3. That is, the block processes assigned to the processor cores 901-1 and 901-3 do not include update of the DB data and the column data 22-1 and 22-3 have no information amount (no data item). In such a case, the distributed caches 4-1 and 4-3 corresponding to the processor cores 901-1 and 901-3 may be omitted.

For example, according to the flowchart illustrated in FIG. 10, the processor core 901-1 waits until the name card 910 is inputted, and upon input of the name card 910, proceeds to Step S101 (Step S100). In Step S101, the processor core 901-1 searches the record 920 having the person's name 921 corresponding to the inputted name card 910 from the accounting information database 902, and obtains the current total amount 922 in the searched record 920. The processor core 901-1 assigns the obtained total amount 922 to ASS_DATA [2]. In the present example, ASS_DATA [1] and ASS_DATA [3] does not exist. Also, the instruction content is fixed, and therefore the operation in Step S102 is omitted. Furthermore, the block process assigned to the processor core 901-1 include neither update of the DB data nor any process other than read from the database, and therefore the processes (Step S122 in FIG. 12, specifically Steps S110 to S113 in FIG. 11) common to all of the process units are all omitted.

Subsequently, the processor core 901-1 outputs the name card 910 and ASS_DATA [2] (for example, content of the total amount 922 in the record 920 having the person's name 921 corresponding to the inputted name card 910, which has been read from the accounting information database 902) to the next processor core 901-2 (Step S104). Then, the processor core 901-1 ends the block process for the first input of the mane card 910, and waits for the next timing to start the block process.

When the name card 910 indicating "TANAKA" is successively inputted,the processor core 901-1 again reads the record 920 having the same person's name 922 as "TANAKA", assigns the total amount 922 in the record 920 to ASS_DATA [2], and delivers ASS_DATA [2] to the next processor core 901-2, as the block process for the second input of the name card 910. It should be noted that, in the parallel processing based on the pipelining, the processor core 901-2 executes the block process for the first input of the name card 910 while the processor core 901-1 executes the block process for the second input of the name card 910. Accordingly, in the block process by the processor core 901-1 for the second input of the name card 910 indicating "TANAKA", the content of the total amount 922 is read from the accounting information database 902 before the content updated for the first input of the name card 910 indicating "TANAKA" is reflected in the total amount 922.

Figure 12:
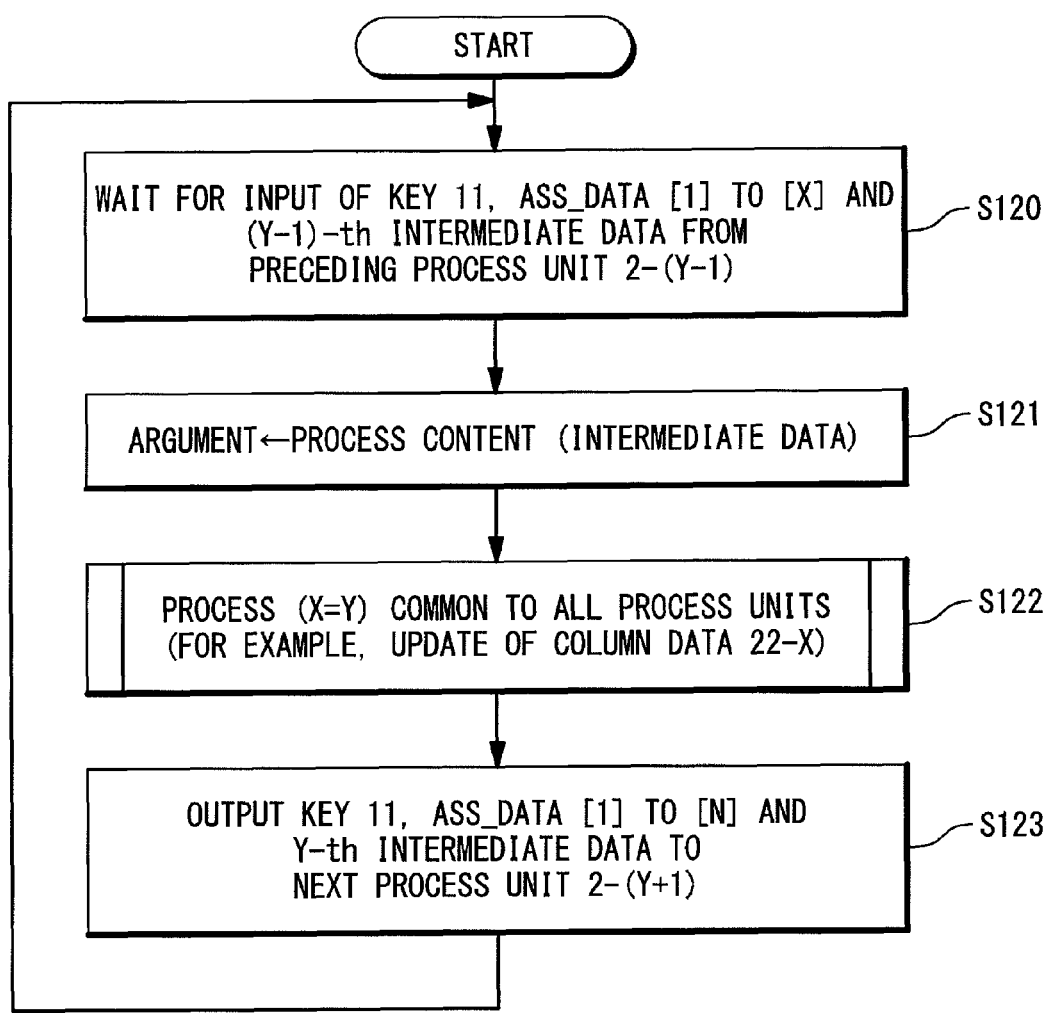
FIG. 12 is a flowchart illustrating an example of operation of the second to (N−1)-th process units 2-Y (Y is equal to or more than 2 and less than N)

Next, the operations of the second to (N–1)-th process units 2-Y (Y is an integer equal to or more than 2 and less than N) are described referring to FIG. 12. FIG. 12 is a flowchart illustrating an example of the operations of the second to (N–1)-th process units 2-Y according to the exemplary embodiment. As illustrated in FIG. 12, the process unit Y of which the processing order is one of second to (N–1)-th waits until the key 11, ASS_DATA [1] to ASS_DATA [N], and (Y–1)-th intermediate data are inputted from the (Y–1)-th process unit 2-(Y–1), and upon input of those, proceeds to the next Step S121 (Step S120).

In Step S121, the process unit 2-Y assigns an alias ARGUMENT to the (Y–1)-th intermediate data delivered from the previous process unit 2-(Y–1), and proceeds to Step S122.

Subsequently, the process unit 2-Y executes a processing operation common to all of the process units (Step S122). The operation of Step S122 is the same as that described as Step S103 for reading by the process unit 2-1 in FIG. 10. That is, as illustrated in FIG. 11, the past processing result is reflected in the content of the column data 22-X, and then, the column data 22-X is updated and the updated content is added to the distributed cache 4-2, as needed. Here, the update of the column data 22-X is controlled by the corresponding process unit 2-X (X=Y in this case). When X=2, the past processing result is reflected in the content of the column data 22-2 corresponding to the process unit 2-2, i.e., the content of ASS_DATA [2], and then, the content of ASS_DATA [2] is updated and the result is added to the distributed cache 4-2, as needed. In such case, the process unit 2-2 can refer to ASS_DATA [1] and ASS_DATA [2].

After the operations (Steps S110 to S113 in FIG. 11) common to all of the process units 2-1 to 2-N have been completed, the process unit 2-Y outputs the key 11, ASS_DATA [1] to ASS_DATA [N], and Y-th intermediate data to the (Y+1)-th process unit 2-(Y+1) (Step S123). Then, the process unit 2-Y ends the process for the one of the processing objects 10. The process unit 2-Y returns to Step S120, and waits for the next timing to start the block processing.

For example, when the exemplary embodiment is applied to the accounting apparatus 900 illustrated in FIG. 1, the processor core 901-2 corresponding to the process unit 2-2 operates according to the flowchart illustrated in FIG. 12. For example, according to the flowchart illustrated in FIG. 12, the processor core 901-2 waits until the name card 910 and ASS_DATA [2] are inputted from the processor core 901-1, and upon input of those, proceeds to Step S121 (Step S120). Also for the processor core 901-2, the instruction content is fixed, and therefore the operation in Step S121 is omitted.

Subsequently, the processor core 901-2 executes a processing operation common to the processor cores to each of which the block process including update of the DB data is assigned (Step S122). At first, the past processing result is reflected in the content of the total amount 922 as the column data 22-2 assigned to the processor core 901-2. The processor core 901-2 searches the distributed cache 4-2 associated with the processor core 901-2 and judges whether or not the same content of the total amount 922 as that of the total amount 922 in the series of processes for the processing object 10 (name card 910) of this time is registered in the distributed cache 4-2 (Step S110). For example, when the series of processes is currently executed for the name card 901 indicating "TANAKA", the processor core 901-2 judges whether or not a cache entry having the same person's name 922 as "TANAKA" exists. If such cache entry exists (Yes in Step S110), the content of ASS_DATA [2] is rewritten with the latest content of the corresponding total amount 922 searched in the distributed cache 4-X.

On the other hand, if such cache entry does not exist (No in Step S110), it is judged that ASS_DATA [2] holds the content in which the past processing result is reflected, and the flow proceeds to Step S112.

After the process for reflecting the past processing result in ASS_DATA [2] is completed, a predetermined process assigned to the process unit 2-X is executed in Step S112. For example, the processor core 901-2 adds 1 to ASS_DATA [2]. After the predetermined process assigned to the processor core 901-2 in Step S112 is completed, the processor core 901-2 causes the distributed cache 4-2 to store the content of the total amount 922 updated in the process, i.e., the content of ASS_DATA [2], together with the person's name 921 for identifying the total amount 922 (Step S113). The distributed cache 4-2 is required to have a storage capacity capable of holding cache entries for at least two times.

Subsequently, the processor core 901-2 outputs the name card 910 and ASS_DATA [2] (for example, the content of the total amount 922 updated in Step S112) to the next processor core 901-3 (Step S123). Then, the processor core 901-2 ends the block process for the first input of the name card 901, and waits for the next timing to start the block process.

When the name card 910 indicating "TANAKA" is successively inputted, the processor core 901-2 again updates the total amount 922 for "TANAKA" and delivers the result to the next processor core 901-3, in the block process for the second input of the name card 910. In Step S112 in the second block process, the content which is actually read from the accounting information database 902 and delivered from the processor core 901-1 is not used as the content of ASS_DATA [2], however, the content which is added to the distributed cache 4-2 in Step S113 in the first block process and rewritten in Step S111 in the second block process is used as the content of ASS_DATA [2]. At the timing of completion of the second block process, the content of the total amount 922 for "TANAKA" updated in the first block process and the content of the total amount 922 for "TANAKA" updated in the second block process is held in the distributed cache 4-2.

When the name card 910 indicating "TANAKA" is further inputted successively, the processor core 901-2 again updates the total amount 922 for "TANAKA" and delivers the result to the next processor core 901-3, in the block process for the third input of the name card 910. In Step S112 in the third block process, the content (latest content) which is added to the distributed cache 4-2 in Step S113 in the second block process and rewritten in Step S111 in the third block process is used. At the timing of completion of the third block process, the content of the total amount 922 for "TANAKA" updated in the second block process and the content of the total amount 922 for "TANAKA" updated in the third block process is held in the distributed cache 4-2.

When name cards 910 indicating other names are inputted to the accounting apparatus between the first and second inputs of the name cards 910 indicating the same name and the updated content obtained in the first process is deleted from the distributed cache 4-2, since that content is reflected in the accounting information database 902 and can be obtained therefrom, the processor core 901-2 can directly use the content of ASS_DATA [2] taken over from the processor core 901-1.

Figure 13:
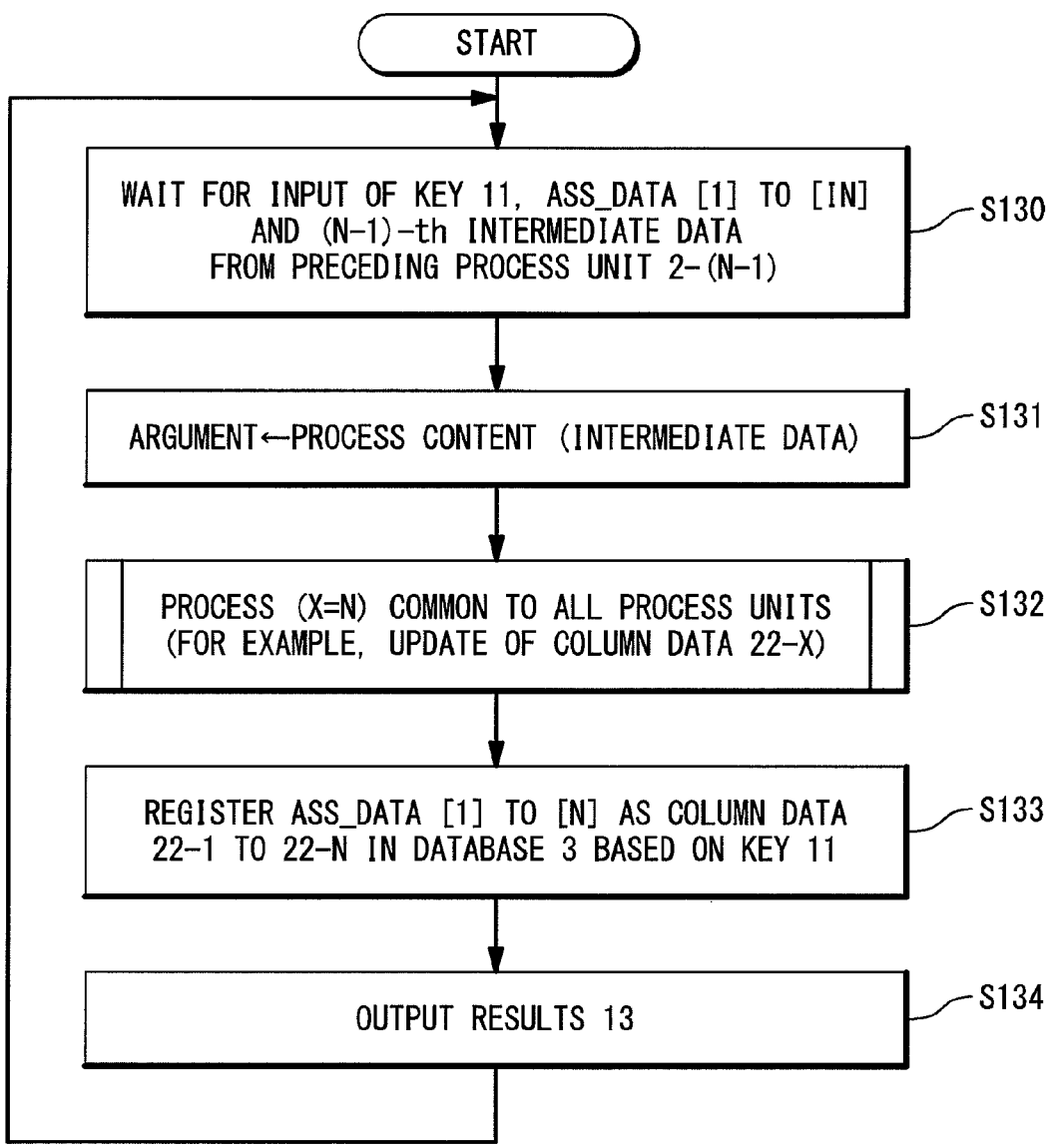
FIG. 13 is a flowchart illustrating an example of operation of the N-th process unit 2-N.

Next, an operation of the last (N-th) process unit 2-N is described referring to FIG. 13. FIG. 13 is a flowchart illustrating an example of the operation of the N-th process unit 2-N according to the exemplary embodiment. As illustrated in FIG. 13, the process unit 2-N of the last processing order waits until the key 11, ASS_DATA [1] to ASS_DATA [N], and (N−1)-th intermediate data are inputted from the (N−1)-th process unit 2-(N−1), and upon input of those, proceeds to the next Step S131 (Step S130).

In Step S131, the process unit 2-N assigns an alias ARGUMENT to the (N−1)-th intermediate data delivered from the previous process unit 2-(N−1), and proceeds to Step S132.

Subsequently, the process unit 2-N executes a process operation common to all of the process unit (Step S132). The operation in Step S132 is the same as that described as Step S103 for reading by the process unit 2-1 in FIG. 10. That is, as illustrated in FIG. 11, the past processing result is reflected in the content of the column data 22-X, and then, the column data 22-X is updated and the updated content is added to the distributed cache 4-X, as needed. Here, the update of the column data 22-X is controlled by the corresponding process unit 2-X (X=N in this case). When X=N, the past processing result is reflected in the content of the column data 22-N corresponding to the process unit 2-N, i.e., the content of ASS_DATA [N], and then, the content of ASS_DATA [N] is updated and the result is added to the distributed cache 4-N, as needed. In such case, the process unit 2-N can refer to ASS_DATA [1] to ASS_DATA [N−1].

After the operations (Steps S110 to S113 in FIG. 11) common to all of the process units 2-1 to 2-N have been completed, the process unit 2-N reflects the contents of the column data 22-1 to 22-N updated in the series of process for the processing object 10 of this time in the database 3 (Step S133). The process unit 2-N searches the record 20 having the same key 21 as the key 11 from the database 3, and writes in the database 3 the content of the ASS_DATA [1] to ASS_DATA [N] as content of the column data 22-1 to 22-N included in the record 20.

Subsequently, the process unit 2-N outputs information indicating the results of the processes, 13 (Step S134). Then, the process unit 2-N ends the process for the one of the processing objects. The process unit 2-N returns to Step S130, and waits for the next timing to start the block process.

For example, when the exemplary embodiment is applied to the accounting apparatus 900 illustrated in FIG. 1, the processor core 901-3 corresponding to the process unit 2-N operates according to the flowchart illustrated in FIG. 13. For example, according to the flowchart illustrated in FIG. 13, the processor core 901-3 waits until the name card 910 and ASS_DATA [2] are inputted from the processor core 901-2, and upon input of those, proceeds to Step S131 (Step S130). Also for the processor core 901-3, the instruction content is fixed, and therefore the operation in Step S131 is omitted.

Also, the block process assigned to the processor core 901-3 includes neither update of the DB data nor any process other than read from the database, and therefore the processes (Step S132 in FIG. 13, specifically Steps S110 to S113 in FIG. 11) common to all of the process units are all omitted.

Subsequently, the processor core 901-3 reflects the content of the total amount 922 as the column data updated in the series of processes for the name card 910 of this time in the accounting information database 902 (Step S133). The processor core 901-3 searches the record 920 having the same person's name 921 as that indicated on the name card 910 in the accounting information database 902 and writes the content of ASS_DATA [2] as the content of the total amount 922 included in the record 920. The processor core 901-3 outputs information indicating the results 13 (Step S134), if necessary. Then, the processor core 901-3 ends the block process for the one-time input of the name card 910, and waits for the next timing to start the block process.

Even if the name card 910 indicating "TANAKA" is inputted immediately after the first input of the name card indicating "TANAKA", the content of the total amount 922 updated based on the content in which the past processing result is reflected is inputted as ASS_DATA [2] from the processor core 901-2 to the processor core 901-3, and therefore the processor core 901-3 directly writes the content of the delivered ASS_DATA [2] in the accounting information database 902 without executing special processing.

As described above, according to the exemplary embodiment, the consistencies of database and result are ensured, and the series of processes including access to the database is executed in parallel through pipelining.

FIG. 14 is a time chart for a case that the exemplary embodiment is applied to the accounting apparatus 900 illustrated in FIG. 1. The time chart in FIG. 14 corresponds to an example in which the name card 910 indicating "TANAKA" is successively inputted three times. First, at time t1, in response to the first input of the name card 910 indicating "TANAKA", the processor core 901-1 starts the block process for the first input of the name card 910 indicating "TANAKA". In the block process for the first input of the name card 910 indicating "TANAKA", the processor core 901-1 reads the current total amount 922 for "TANAKA" from the accounting information database 902, and outputs its value (X=15) together with the person's name 921 ("TANAKA") to the processor core 901-2. At this time, the processor cores 901-2 and 901-3 are waiting for data input, respectively.

At time t2, in response to the input of the data ("TANAKA" and X=15) from the processor core 901-1, the processor core 901-2 starts the block process for the first input of the name card 910 indicating "TANAKA". In response to the second input of the name card 910, the processor core 901-1 starts the block process for the second input of the name card 910 indicating "TANAKA" in parallel with the processor core 901-2. At this time, the processor core 901-3 is waiting for data input.

In the block process for the first input of the name card 910 indicating "TANAKA", the processor core 901-2 confirms that no corresponding data exists in the distributed cache 4-2, and then executes an accounting processing (X←X+1) based on the delivered value (X=15). The processor core 901-2 adds the value (X=16) updated in the accounting processing to the distributed cache 4-2 such that the updated value is linked with the person's name 921 ("TANAKA"), and then outputs the value (X=16) together with the person's name 921 ("TANAKA") to the processor core 901-3. In the block process for the second input of the name card 910 indicating "TANAKA", the processor core 901-1 reads the current total amount 922 for "TANAKA" from the accounting information database 902, and outputs its value (X=15) together with the person's name 921 ("TANAKA") to the processor core 901-2.

At time t3, in response to the input of the data ("TANAKA" and X=16) from the processor core 901-2, the processor core 901-3 starts the block process for the first input of the name card 910 indicating "TANAKA". In response to the input of the data ("TANAKA" and X=15) from the processor core 901-1, the processor core 901-2 starts the block process for the second input of the mane card 910 indicating "TANAKA" in parallel with the processor core 901-3. In response to the third input of the name card 910 indicating "TANAKA", the processor core 901-1 starts the block process for the third input of the name card 910 indicating "TANAKA" in parallel with the processor cores 901-3 and 901-2.

In the block process for the first input of the name card 910 indicating "TANAKA", the processor core 901-3 writes the updated value (X=16) of the total amount 922 delivered from the processor core 901-2 in the accounting information database 902. In the block process for the second input of the name card 910 indicating "TANAKA", the processor core 901-2 confirms that the corresponding data (data added at time t2) exists in the distributed cache 4-2, and executes an accounting processing (X←X+1) based on the value (X=16) of the corresponding data. Then, the processor core 901-2 adds the value (X=17) updated in the accounting processing to the distributed cache 4-2 such that the updated value is linked with the person's name 921 ("TANAKA"), and then outputs the value (X=17) together with the person's name 921 ("TANAKA") to the processor core 901-3. In the block process for the third input of the name card 910 indicating "TANAKA", the processor core 901-1 reads the current total amount 922 for "TANAKA" from the accounting information database 902, and outputs its value (X=15) together with the person's name 921 ("TANAKA") to the processor core 901-2.

At time t4, in response to the input of the data ("TANAKA" and X=17) from the processor core 901-2, the processor core 901-3 starts the block process for the second input of the name card 910. In response to the input of the data ("TANAKA" and X=15) from the processor core 901-1, the processor core 901-2 starts the block process for the third input of the name card 910 indicating "TANAKA" in parallel with the processor core 901-3. At this time, the processor core is waiting for data input.

In the block process for the second input of the name card 910 indicating "TANAKA", the processor core 901-3 writes the updated value (X=17) of the total amount 922 delivered from the processor core 901-2 in the accounting information database 902. In the block process for the third input of the name card 910 indicating "TANAKA", the processor core 901-2 confirms that the corresponding data (data added at the times t2 and t3) exists in the distributed cache 4-2, and then executes an accounting processing (X←X+1) based on the latest value (X=17) of the corresponding data. Then, the processor core 901-2 adds the value (X=18) updated in the accounting processing to the distributed cache 4-2 such that the updated value is linked with the person's name 921 ("TANAKA"), and then outputs the updated value (X=18) together with the person's name 921 ("TANAKA") to the processor core 901-3.

At time t5, in response to the input of the data ("TANAKA" and X=18) from the processor core 901-2, the processor core 901-3 starts the block process for the third input of the name card 910 indicating "TANAKA". At this time, the processor cores 901-1 and 901-2 are waiting for data input, respectively.

In the block process for the third input of the name card 910 indicating "TANAKA", the processor core 901-3 writes the updated value (X=18) of the total amount 922 delivered from the processor core 901-2 in the accounting information database 902.

As illustrated in FIG. 14, according to the exemplary embodiment, even if the accounting apparatus 900 successively receives the name card 910 indicating "TANAKA" three times, the desired results can be obtained without pipeline stall.

The exemplary embodiment described above can be expressed as follows.

An information processing apparatus includes a plurality of process units operable in parallel and a cache unit. The information processing apparatus executes a series of processes including access to a database through pipelining of the plurality of process units. The plurality of process units corresponds to a plurality of block process on a one-by-one basis. The series of processes are divided into the plurality of block processes such that reference of a content of data stored in the database by one of the plurality of process units is not followed by update of the data by any of others of the plurality of process units. Each of the plurality of process units executes one of the plurality of block processes at a predetermined timing. The plurality of block processes include a first block process including update of first data in the database. The plurality of process units includes a first process unit corresponding to the first block process. Updated contents of the first data are obtained in executions of the first block process by the first process unit. The cache unit is provided to be associated with the first process unit and holds the updated contents in a format by which an order of additions of the updated contents is recognizable.

It is preferable that the first process unit prefers a latest one of the updated contents to a content of the first data stored in the database in order to refer to the first data.

The first process unit preferably includes a registration unit for adding the updated contents to the cache unit and a selection unit which prefers a latest one of the updated contents to a content of the first data stored in the database in order to select an object of reference by the first process unit.

It is preferable that a plurality of data items of the database are respectively assigned to the plurality of process units in advance. Each of the plurality of process units can execute update only for data relevant to one of the plurality of data items, which is assigned to the each of plurality of process units and can execute reference only for data relevant to data items of the plurality of data items, which are assigned to process units of the plurality of process units. The process units of the plurality of process units correspond to previous stages in the pipelining preceding a stage to which the each of the plurality of process units corresponds.

The series of processes are preferably divided such that reading of content of data from the database is allowed only for number M of block processes of the plurality of block processes and writing of content of data in the database is allowed only for number N of block processes of the plurality of block processes. The number N is equal to or less than a predetermined number. The number M is equal to or less than a predetermined number.

The plurality of block processes preferably include an initial block process executed at first and a final block process executed at last. The series of processes are divided such that reading of content of data from the database is allowed only for the initial block process and writing of content of data in the database is allowed only for the final block process.

The cache unit is preferably embodied as a FIFO (First-In First-Out) queue.

The plurality of process units are preferably embodied by one or more microprocessors.

The exemplary embodiment can be applied to not only an information processing apparatus which executes a series of processes including access to a database but also an information processing apparatus which includes one or more processors for operating one or more processing units, such as thread, process and task, operable in parallel. The information processing apparatus including one or more processors executes a series of processes which may cause a data hazard when executed through pipelining.

While the invention has been particularly shown and described with reference exemplary embodiments thereof, the invention is not limited to these embodiments. It will be understood by those skilled in the art that various changes in form and details may be made therein without departing from the spirit and scope of the present invention as defined by the claims.

What is claimed is:

1. An information processing apparatus comprising:
a plurality of process units operable in parallel; and
a cache unit,
wherein the information processing apparatus executes a series of processes including access to a database through pipelining of said plurality of process units,
said plurality of process units corresponds to a plurality of block processes on an one-by-one basis,
said series of processes are divided into said plurality of block processes such that reference of a content of data stored in said database by one of said plurality of process units is not followed by update of said data by any of others of said plurality of process units,
each of said plurality of process units executes one of said plurality of block processes at a predetermined timing,
said plurality of block processes include a first block process including update of first data in said database,
said plurality of process units includes a first process unit corresponding to said first block process,
updated contents of said first data are obtained in executions of said first block process by said first process unit,
said cache unit is provided to be associated with said first process unit and holds said updated contents in a format by which an order of additions of said updated contents is recognizable,
a plurality of data items of said database are respectively assigned to said plurality of process units in advance,
each of said plurality of process units execute an update only for data relevant to one of said plurality of data items, which is assigned to said each of plurality of process units and execute a reference only for data relevant to data items of said plurality of data items, which are assigned to process units of said plurality of process units, and
said process units of said plurality of process units correspond to previous stages in said pipelining preceding a stage to which said each of said plurality of process units corresponds.

2. The information processing apparatus according to claim 1, wherein said first process unit prefers a latest one of said updated contents to a content of said first data stored in said database in order to refer to said first data.

3. The information processing apparatus according to claim 1, wherein said first process unit includes:
a registration unit for adding said updated contents to said cache unit; and
a selection unit which prefers a latest one of said updated contents to a content of said first data stored in said database in order to select an object of reference by said first process unit.

4. An information processing apparatus comprising:
a plurality of process units operable in parallel; and
a cache unit,
wherein the information processing apparatus executes a series of processes including access to a database through pipelining of said plurality of process units,
said plurality of process units corresponds to a plurality of block processes on an one-by-one basis,
said series of processes are divided into said plurality of block processes such that reference of a content of data stored in said database by one of said plurality of process units is not followed by update of said data by any of others of said plurality of process units,
each of said plurality of process units executes one of said plurality of block processes at a predetermined timing,
said plurality of block processes include a first block process including update of first data in said database,
said plurality of process units includes a first process unit corresponding to said first block process,
updated contents of said first data are obtained in executions of said first block process by said first process unit,
said cache unit is provided to be associated with said first process unit and holds said updated contents in a format by which an order of additions of said updated contents is recognizable,
said series of processes are divided such that reading of content of data from said database is allowed only for number M of block processes of said plurality of block processes and writing of content of data in said database is allowed only for number N of block processes of said plurality of block processes,
said number N is equal to or less than a predetermined number, and
said number M is equal to or less than a predetermined number.

5. An information processing apparatus comprising:
a plurality of process units operable in parallel; and
a cache unit,
wherein the information processing apparatus executes a series of processes including access to a database through pipelining of said plurality of process units, said plurality of process units corresponds to a plurality of block processes on an one-by-one basis, said series of processes are divided into said plurality of block processes such that reference of a content of data stored in said database by one of said plurality of process units is not followed by update of said data by any of others of said plurality of process units, each of said plurality of process units executes one of said plurality of block processes at a predetermined timing, said plurality of block processes include a first block process including update of first data in said database, said plurality of process units includes a first process unit corresponding to said first block process, updated contents of said first data are obtained in executions of said first block process by said first process unit, said cache unit is provided to be associated with said first process unit and holds said updated contents in a format by which an order of additions of said updated contents is recognizable, said plurality of block processes include an initial block process executed at first and a final block process executed at last, and said series of processes are divided such that reading of content of data from said database is allowed only for said initial block process and writing of content of data in said database is allowed only for said final block process.

6. The information processing apparatus according to claim 1, wherein said cache unit is embodied as a FIFO (First-In First-Out) queue.

7. An information processing method comprising:

executing a series of processes including access to a database through pipelining of a plurality of process units, and wherein said plurality of process units correspond to a plurality of block processes on an one-by-one basis, said series of processes are divided into said plurality of block processes such that reference of a content of data stored in said database by one of said plurality of process units is not followed by update of said data by any of others of said plurality of process units, said plurality of block processes include a first block process including update of first data in said database, said executing includes:

holding updated contents of said first data obtained in executions of said block process in a format by which an order of additions of said updated contents is recognizable; and preferring a latest one of said updated contents to a content of said first data stored in said database in order to refer to said first data, a plurality of data items of said database are respectively assigned to said plurality of process units in advance, and each of said plurality of process units execute an update only for data relevant to one of said plurality of data items, which is assigned to said each of plurality of process units and execute a reference only for data relevant to data items of said plurality of data items, which are assigned to process units of said plurality of process units, and said process units of said plurality of process units correspond to previous stages in said pipelining preceding a stage to which said each of said plurality of process units corresponds.

8. The information processing method according to claim 7, wherein said plurality of process units includes:

a first process unit corresponding to a first stage in said pipelining;

a second process unit corresponding to a second stage in said pipelining, which is previous to said first stage; and a third process unit corresponding to a third stage in said pipelining, which is subsequent to said first stage, said plurality of block processes include a second block process assigned to said second process unit and a third block process assigned to said third process unit, said executing includes:

said second process unit reading a content of said first data from said database by executing said second block process;

said first process unit executing said first block process to obtain one of said updated contents; and said third process unit writing said one of said updated contents in said database by executing said third block process.

9. A computer-readable non-transitory recording medium in which a computer-executable program code is recorded for realizing an information processing method, the method comprising:

executing a series of processes including access to a database through pipelining of a plurality of process units, and wherein said plurality of process units correspond to a plurality of block processes on an one-by-one basis, said series of processes are divided into said plurality of block processes such that reference of a content of data stored in said database by one of said plurality of process units is not followed by update of said data by any of others of said plurality of process units, said plurality of block processes include a first block process including update of first data in said database, said executing includes:

holding updated contents of said first data obtained in executions of said block process in a format by which an order of additions of said updated contents is recognizable; and preferring a latest one of said updated contents to a content of said first data stored in said database in order to refer to said first data, a plurality of data items of said database are respectively assigned to said plurality of process units in advance, and each of said plurality of process units execute an update only for data relevant to one of said plurality of data items, which is assigned to said each of plurality of process units and execute a reference only for data relevant to data items of said plurality of data items, which are assigned to process units of said plurality of process units, and said process units of said plurality of process units correspond to previous stages in said pipelining preceding a stage to which said each of said plurality of process units corresponds.

* * * * *